United States Patent
Koyuhara et al.

(10) Patent No.: US 10,937,579 B2
(45) Date of Patent: Mar. 2, 2021

(54) MNZN-FERRITE AND ITS PRODUCTION METHOD

(71) Applicant: HITACHI METALS, LTD., Tokyo (JP)

(72) Inventors: Norikazu Koyuhara, Mishima-gun (JP); Yasuharu Miyoshi, Mishima-gun (JP); Tomoyuki Tada, Mishima-gun (JP); Satoru Tanaka, Tottori (JP)

(73) Assignee: HITACHI METALS, LTD., Tokyo (JP)

( * ) Notice: Subject to any disclaimer, the term of this patent is extended or adjusted under 35 U.S.C. 154(b) by 221 days.

(21) Appl. No.: 15/537,688

(22) PCT Filed: Dec. 24, 2015

(86) PCT No.: PCT/JP2015/086006
§ 371 (c)(1),
(2) Date: Jun. 19, 2017

(87) PCT Pub. No.: WO2016/104593
PCT Pub. Date: Jun. 30, 2016

(65) Prior Publication Data
US 2017/0352455 A1    Dec. 7, 2017

(30) Foreign Application Priority Data

Dec. 25, 2014 (JP) .............................. JP2014-262145

(51) Int. Cl.
*H01F 1/34*    (2006.01)
*H01F 41/02*   (2006.01)
(Continued)

(52) U.S. Cl.
CPC ......... *H01F 1/344* (2013.01); *C04B 35/2658* (2013.01); *C04B 35/62685* (2013.01);
(Continued)

(58) Field of Classification Search
CPC .............. H01F 1/344; C04B 35/2658; C04B 35/62685; C04B 2235/3208;
(Continued)

(56) References Cited

U.S. PATENT DOCUMENTS 7,540,972 B2 *   6/2009   Ishikura ............... C01G 49/009
                                                      252/62.59
7,754,094 B2 *   7/2010   Takahashi ........... C04B 35/2658
                                                      252/62.59
(Continued)

FOREIGN PATENT DOCUMENTS

JP    06-132111 A    5/1994
JP    06-290925 A   10/1994
(Continued)

OTHER PUBLICATIONS

International Search Report of PCT/JP2015/086006 dated Feb. 16, 2016 [PCT/ISA/210].

*Primary Examiner* — C Melissa Koslow
(74) *Attorney, Agent, or Firm* — Sughrue Mion, PLLC

(57) ABSTRACT

A method for producing MnZn-ferrite comprising Fe, Mn and Zn as main components, and at least Co, Si and Ca as sub-components, the main components in the MnZn-ferrite comprising 53-56% by mol (as $Fe_2O_3$) of Fe, and 3-9% by mol (as ZnO) of Zn, the balance being Mn as MnO, comprising the step of sintering a green body to obtain MnZn-ferrite; the sintering comprising a temperature-elevating step, a high-temperature-keeping step, and a cooling step; the high-temperature-keeping step being conducted at a keeping temperature of higher than 1050° C. and lower than 1150° C. in an atmosphere having an oxygen concentration of 0.4-2% by volume; the oxygen concentration being in a range of 0.001-0.2% by volume during cooling from 900° C. to 400° C. in the cooling step; and the cooling speed between (Tc+70)° C. and 100° C. being 50° C./hour (Continued)

or more, wherein Tc represents a Curie temperature (° C.) calculated from % by mass of $Fe_2O_3$ and ZnO.

9 Claims, 4 Drawing Sheets

(51) Int. Cl.
  *C04B 35/626* (2006.01)
  *C04B 35/64* (2006.01)
  *H01F 1/36* (2006.01)
  *C04B 35/26* (2006.01)

(52) U.S. Cl.
  CPC ............... *C04B 35/64* (2013.01); *H01F 1/36* (2013.01); *H01F 41/0246* (2013.01); *C04B 2235/3208* (2013.01); *C04B 2235/3239* (2013.01); *C04B 2235/3251* (2013.01); *C04B 2235/3255* (2013.01); *C04B 2235/3263* (2013.01); *C04B 2235/3277* (2013.01); *C04B 2235/3284* (2013.01); *C04B 2235/3418* (2013.01); *C04B 2235/5445* (2013.01); *C04B 2235/6562* (2013.01); *C04B 2235/6565* (2013.01); *C04B 2235/6584* (2013.01)

(58) Field of Classification Search
  CPC .... C04B 2235/3239; C04B 2235/3251; C04B 2235/3277; C04B 2235/3418; C04B 2235/6565; C04B 2235/6584
  See application file for complete search history.

(56) References Cited

U.S. PATENT DOCUMENTS

| | | | | |
|---|---|---|---|---|
| 7,790,053 | B2* | 9/2010 | Ishiwaki | C04B 35/2658 |
| | | | | 252/62.62 |
| 8,158,018 | B2* | 4/2012 | Nakahata | C04B 35/2658 |
| | | | | 252/62.59 |
| 2007/0205390 | A1* | 9/2007 | Ishikura | C04B 35/2658 |
| | | | | 252/62.62 |
| 2007/0267594 | A1* | 11/2007 | Fanton | C04B 35/2658 |
| | | | | 252/62.62 |
| 2008/0007377 | A1 | 1/2008 | Ishiwaki et al. | |
| 2009/0242827 | A1 | 10/2009 | Nakahata et al. | |

FOREIGN PATENT DOCUMENTS

| | | |
|---|---|---|
| JP | 08-148323 A | 6/1996 |
| JP | 2007-051052 A | 3/2007 |
| JP | 2007-112695 A | 5/2007 |
| JP | 2009-227554 A | 10/2009 |
| WO | 2006/054749 A1 | 5/2006 |

* cited by examiner

MNZN-FERRITE AND ITS PRODUCTION METHOD

CROSS REFERENCE TO RELATED APPLICATIONS

This application is a National Stage of International Application No. PCT/JP2015/086006, filed Dec. 24, 2015 (claiming priority based on Japanese Patent Application No. 2014-262145, filed Dec. 25, 2014), the contents of which are incorporated herein by reference in their entirety.

FIELD OF THE INVENTION

The present invention relates to a production method of MnZn-ferrite used in electronic devices such as transformers, choke coils, etc. in switching power supplies, etc., and MnZn-ferrite.

BACKGROUND OF THE INVENTION

Switching power supplies are used in various power supply circuits in electronic apparatuses, such as electric vehicles (EVs), hybrid electric vehicles (HEVs), mobile communications equipments (cell phones, smartphones, etc.), personal computers, servers, etc.

Recent electronic apparatuses are increasingly required to be small and light in weight, consuming less electric power from the aspect of energy efficiency. Accordingly, large-scale integrated circuits (LSIs) such as digital signal processors (DSPs), micro-processing units (MPUs), etc., and functional elements used in electronic apparatuses are also required to be small and have high performance and low power consumption. On the other hand, recent higher integration of transistors by finer wiring in LSIs reduces the breakdown voltage of transistors and increases current consumption, resulting in increasingly lower operation voltage and larger current.

Power supply circuits such as DC-DC converters for supplying power to LSIs should also be adapted to lower-voltage, higher-current operation of LSIs. For example, lowering the operation voltage of LSIs narrows a normally operable voltage range, resulting in fluctuated voltage of LSIs due to the ripple of voltage from power supply circuits, so that the operation of LSIs becomes unstable. Accordingly, the switching frequencies of power supply circuits were increased, for example, to 500 kHz or more.

Increase in the frequency and current of power supply circuits is advantageous in reducing the sizes of magnetic cores constituting electronic devices such as transformers, choke coils, etc. used in circuits. For example, when a transformer is operated with a sinusoidal wave, voltage Ep (V) applied to a primary coil is expressed by the formula:

$$Ep = 4.44 \times Np \times A \times f \times Bm \times 10^{-7},$$

wherein Np represents the number of winding of the primary coil, A represents a cross section area (cm$^2$) of a magnetic core, f represents a frequency (Hz), and Bm represents an exciting magnetic flux density (mT).

The formula indicates that when voltage Ep having a higher switching frequency f is applied to a primary coil, a magnetic core can have a smaller cross section area A, resulting in a smaller size. Also, higher current increases the maximum exciting magnetic flux density Bm, which is called "exciting magnetic flux density" below, a magnetic core is further made smaller.

Suitably miniaturizable magnetic cores operated at a high exciting magnetic flux density in a high-frequency range are mainly made of MnZn-ferrite as a magnetic material. MnZn-ferrite has larger initial permeability and saturation magnetic flux density than those of Ni-ferrite, etc., and smaller core loss than those of magnetic cores of Fe-based amorphous alloys, Co-based amorphous alloys, pure iron, and magnetic metals such as Fe—Si, Fe—Ni, Fe—Si—Cr, and Fe—Si—Al. Small core loss is advantageous in suppressing power consumption of power supply circuits. The core loss of MnZn-ferrite has conventionally been reduced by various means concerning crystal grains, composition, production method, etc. It is known that the core loss is effectively reduced in a high-frequency range by insulation by grain boundary phases containing Si and Ca having high electric resistance, which is achieved by reducing the crystal grain sizes of MnZn-ferrite.

Power supply circuits may undergo more than 100° C. by the heat generation of constituent devices and peripheral circuits, temperature elevation from outside, etc., so that they are required to be stably operable at such high temperatures.

JP 6-290925 A and JP 2007-112695 A disclose the technologies of reducing the core loss of MnZn-ferrite in a frequency region of 500 kHz or more by adding Co having a positive crystal magnetic anisotropy constant together with Si and Ca.

The MnZn-ferrite of JP 6-290925 A has low core loss in a with temperature range (20° C. to 120° C.) at a frequency of 500 kHz and an exciting magnetic flux density of 50 mT, but the core loss likely increases largely in a high-temperature range of 100° C. or higher at a higher exciting magnetic flux density.

The MnZn-ferrite of JP 2007-112695 A can have a low core loss in a high-frequency range of 500 kHz or more by setting a cooling speed to 45° C./hour or less in a cooling process from a range of 240–350° C. after sintering at a predetermined temperature, but the core loss likely increases largely in a high-temperature range at a high exciting magnetic flux density.

OBJECT OF THE INVENTION

Accordingly, an object of the present invention is to provide a production method of MnZn-ferrite having a high exciting magnetic flux density with suppressed core loss in a high-temperature environment, and such MnZn-ferrite.

SUMMARY OF THE INVENTION

As a result of intensive research in view of the above object, the inventors have found that by controlling a temperature pattern and the concentration of oxygen in an atmosphere during sintering, in the production of MnZn-ferrite comprising Fe, Mn and Zn as main components, and at least Co, Si and Ca as sub-components, increase in the core loss of the resultant MnZn-ferrite at a high exciting magnetic flux density and a high temperature can be suppressed. The present invention has been completed based on such finding.

Thus, the method of the present invention for producing MnZn-ferrite comprising Fe, Mn and Zn as main components, and at least Co, Si and Ca as sub-components, the main components in the MnZn-ferrite comprising 53-56% by mol (as $Fe_2O_3$) of Fe, and 3-9% by mol (as ZnO) of Zn, the balance being Mn as MnO; comprises the steps of
  sintering a green body to obtain MnZn-ferrite;
  the sintering step comprising a temperature-elevating step, a high-temperature-keeping step, and a cooling step;
  the high-temperature-keeping step being conducted at a keeping temperature of higher than 1050° C. and lower than 1150° C. in an atmosphere having an oxygen concentration of 0.4-2% by volume;
  in the cooling step, the concentration of oxygen being in a range of 0.001-0.2% by volume during cooling from 900° C. to 400° C.; and
  the cooling speed between (Tc+70) ° C. and 100° C. being 50° C./hour or more, wherein Tc represents a Curie temperature (° C.) calculated from the percentages by mol of $Fe_2O_3$ and ZnO.

The Curie temperature (Tc) is calculated from the formulation (% by mol) of Fe oxide ($Fe_2O_3$) and Zn oxide (ZnO), main components in the MnZn-ferrite.

In the high-temperature-keeping step, the keeping temperature is preferably 1060-1140° C., more preferably 1070-1130° C., and the concentration of oxygen in an atmosphere is preferably 0.6-1.5% by volume.

The cooling speed between (Tc+70) ° C. and 100° C. is preferably 100° C./hour or more.

In the cooling step, the concentration of oxygen at 900° C. is preferably 0.001-0.1% by volume, more preferably 0.01-0.1% by volume.

In the temperature-elevating step, the concentration of oxygen in an atmosphere is preferably in a range of 0.4-2% by volume at 900° C. or higher.

The sub-components in the MnZn-ferrite preferably comprise 0.05-0.4% by mass (as $Co_3O_4$) of Co, 0.003-0.015% by mass (as $SiO_2$) of Si, 0.06-0.3% by mass (as $CaCO_3$) of Ca, 0-0.1% by mass (as $V_2O_5$) of V, and 0-0.3% by mass in total of Nb (as $Nb_2O_5$) and/or Ta (as $Ta_2O_5$), per 100% by mass of the main components on the oxide basis.

The MnZn-ferrite of the present invention comprises Fe, Mn and Zn as main components, and at least Co, Si and Ca as sub-components;
  the main components comprising 53-56% by mol (as $Fe_2O_3$) of Fe, and 3-9% by mol (as ZnO) of Zn, the balance being Mn as MnO;
  the sub-components comprising 0.05-0.4% by mass (as $Co_3O_4$) of Co, 0.003-0.015% by mass (as $SiO_2$) of Si, 0.06-0.3% by mass (as $CaCO_3$) of Ca, 0-0.1% by mass (as $V_2O_5$) of V, and 0-0.3% by mass in total of Nb (as $Nb_2O_5$) and/or Ta (as $Ta_2O_5$), per 100% by mass of the main components on the oxide basis; and
  the MnZn-ferrite having core loss Pcv of less than 2180 kW/m³ between 0° C. and 140° C. at a frequency of 1 MHz and at an exciting magnetic flux density of 75 mT.

The MnZn-ferrite of the present invention preferably has a core-loss-minimizing temperature between 30° C. and 100° C.; a core loss change ratio Ps1 determined by the formula 1 of $Ps1(\%)=[(Pcv_{max1}-Pcv_{min})/Pcv_{min}] \times 100$ being 150% or less at a frequency of 1 MHz and at an exciting magnetic flux density of 75 mT, and a core loss change ratio Ps2 determined by the formula 2 of $Ps2(\%)=[(Pcv_{max2}-Pcv_{min})/Pcv_{min}] \times 100$ being 200% or less at a frequency of 1 MHz and at an exciting magnetic flux density of 75 mT, wherein $Pcv_{min}$ represents core loss at the core-loss-minimizing temperature, $Pcv_{max1}$ represents the maximum core loss between 20° C. and 120° C., and $Pcv_{max2}$ represents the maximum core loss between 0° C. and 140° C.

Effects of the Invention

The present invention can provide MnZn-ferrite having a high exciting magnetic flux density with suppressed core loss in a high-temperature environment, and its production method.

DESCRIPTION OF THE PREFERRED EMBODIMENTS

Figure 1:
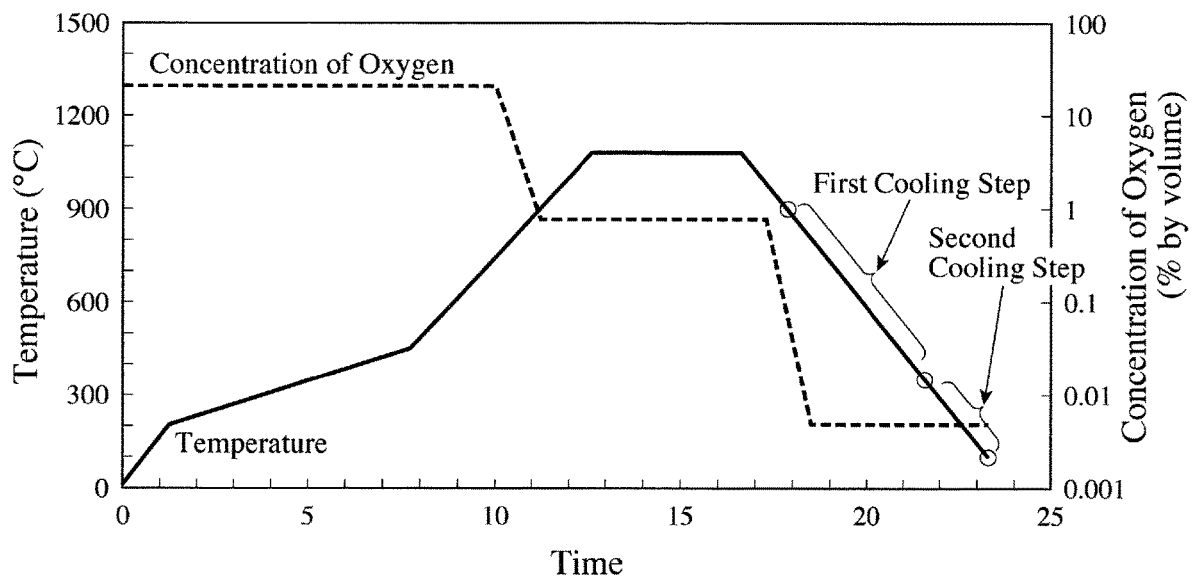
FIG. 1 is a graph showing temperature conditions in a sintering step according to an embodiment of the present invention.

The MnZn-ferrite and its production method according to an embodiment of the present invention will be specifically explained below. It should be noted, however, that the present invention is not restricted thereto, but modifications may be made properly within the scope of the technical idea.

As described above, the method of the present invention produces MnZn-ferrite comprising Fe, Mn and Zn as main components, and at least Co, Si and Ca as sub-components. The main components in the MnZn-ferrite comprise 53-56% by mol (as $Fe_2O_3$) of Fe, and 3-9% by mol (as ZnO) of Zn, the balance being Mn as MnO, and the method comprises a step of sintering a green body to MnZn-ferrite. The sintering comprises a temperature-elevating step, a high-temperature-keeping step, and a cooling step. In the high-temperature-keeping step, the keeping temperature is higher than 1050° C. and lower than 1150° C., and the concentration of oxygen in an atmosphere is 0.4-2% by volume.

When the keeping temperature is 1050° C. or lower in the high-temperature-keeping step, a sufficient sintering density cannot be obtained, likely resulting in a structure containing many fine crystals and pores. When the keeping temperature is 1150° C. or higher, relatively large crystal grains are likely formed despite accelerated sintering, resulting in increased eddy current loss. Accordingly, a keeping temperature outside the above range in the high-temperature-keeping step tends to provide large core loss. With as low a keeping temperature as lower than 1150° C. in the high-temperature-keeping step, excessive growth of crystals can be suppressed, so that increase in eddy current loss is suppressed. In the present invention, the keeping temperature in the high-temperature-keeping step is preferably 1060-1140° C., more preferably 1070-1130° C.

The oxygen concentration of less than 0.4% by volume in the high-temperature-keeping step provides a reducing atmosphere, so that the sintered MnZn-ferrite has low electric resistance and thus increased eddy current loss. On the other hand, the oxygen concentration of more than 2% by volume provides a too oxidizing atmosphere, so that low-resistance magnetite is likely formed, thereby providing relatively large crystal grain sizes and partially too large crystals. As a result, the eddy current loss tends to increase, resulting in large core loss at a high frequency and a high exciting magnetic flux density in an entire temperature range from a low temperature to a high temperature (0° C. to 140° C.).

The concentration of oxygen is preferably set depending on the keeping temperature, and a higher keeping temperature leads to a higher concentration of oxygen. With the concentration of oxygen set depending on the keeping temperature, Ca is segregated in crystal grain boundaries, so that the crystal grain boundaries have higher electric resistance, resulting in reduced core loss.

A lower concentration of oxygen tends to generate a larger amount of $Fe^{2+}$ having a positive crystal magnetic anisotropy constant, resulting in a lower core-loss-minimizing temperature. Accordingly, the concentration of oxygen is preferably not deviated from the above range.

In the cooling step subsequent to the high-temperature-keeping step, the concentration of oxygen in the atmosphere is reduced to such a level as to prevent excessive oxidation and reduction. With the concentration of oxygen of 0.001-0.2% by volume in the atmosphere in a temperature range from 900° C. to 400° C., $Fe^{2+}$ can be generated in a preferred amount range. In the cooling step subsequent to the high-temperature-keeping step, a range from 900° C. to 400° C., in which the concentration of oxygen in the atmosphere is adjusted to a predetermined level, is called "first cooling step."

With the concentration of oxygen adjusted to the above range in the cooling step after the high-temperature-keeping step, Ca can be segregated in grain boundaries of MnZn-ferrite, and the amount of Ca in crystal grains can be properly controlled, to provide crystal grains and boundaries with high electric resistance, thereby decreasing core loss due to eddy current loss.

In the cooling step, the cooling speed between (Tc+70) ° C. and 100° C. is set to 50° C./hour or more, wherein Tc represents a Curie temperature (° C.) calculated from % by mol of iron oxide ($Fe_2O_3$) and zinc oxide (ZnO), main components in MnZn-ferrite. Typically, the cooling speed from 400° C. to 100° C. is desirably 50° C./hour or more. The cooling speed between (Tc+70)° C. and 100° C. is more preferably 100° C./hour or more. In the cooling step, cooling in a temperature range from (Tc+70) ° C. to 100° C. including Tc at a predetermined cooling speed is called "second cooling step."

It is reported that a lower cooling speed than 50° C./hour during the cooling step in the sintering step can provide proper induction magnetic anisotropy, fixing $Co^{2+}$ and $Fe^{2+}$ to magnetic domain walls to suppress the movement of magnetic domain walls, thereby reducing core loss (residual loss) due to magnetic domain wall resonance. However, the inventors' investigation has revealed that a cooling speed of less than 50° C./hour in the second cooling step drastically increases high-temperature core loss at a high exciting magnetic flux density, despite low core loss at 20° C. corresponding to room temperature. It is considered that the cooling speed of less than 50° C./hour likely provides a snake-shaped (called "perminvar-type") hysteresis curve in a major loop of a hysteresis curve, resulting in large hysteresis loss at a high exciting magnetic flux density, particularly extremely increased core loss at high temperatures. On the other hand, the cooling speed of more than 300° C./hour may make it difficult to control the temperature and the cooling speed in a sintering furnace, though variable depending on the capacity of the sintering furnace.

The atmosphere in the second cooling step may be an inert gas or the air. The atmosphere in the first cooling step may be used with its concentration of oxygen adjusted, or the atmosphere may be changed to air or an inert gas in the course of the second cooling step.

The cooling speed in the first cooling step is preferably 50-300° C./hour for reasons described below, though not restrictive as long as the temperature and the concentration of oxygen are adjustable in the sintering furnace. The cooling speed of less than 50° C./hour in the first cooling step requires a long sintering time, undesirably resulting in a longer residing time in the sintering furnace, and thus lower productivity and higher cost. On the other hand, the cooling speed of more than 300° C./hour may make it difficult to keep the temperature and the concentration of oxygen uniformly in a sintering furnace, though variable depending on the capacity of the sintering furnace.

The unevenness of crystal grain sizes is suppressed by setting the keeping temperature and the concentration of oxygen in predetermined ranges in the high-temperature-keeping step, and by controlling the concentration of oxygen in a particular range during cooling from 900° C. to 400° C. in the cooling step, so that the amounts of $Co^{2+}$ ions and $Fe^{2+}$ ions can be adjusted to proper levels to reduce core loss. Further, the induced magnetic anisotropy is controlled by adjusting the cooling speed between the Curie temperature (Tc)+70° C. and 100° C. to 50° C./hour or more, providing well-balanced residual loss and hysteresis loss. The above conditions presumably make it possible to obtain MnZn-ferrite having a large exciting magnetic flux density in a high-frequency range with suppressed increase in core loss in a high-temperature environment.

The present invention provides MnZn-ferrite having core loss Pcv of less than 2180 kW/$m^3$ between 0° C. and 140° C. at a frequency of 1 MHz and an exciting magnetic flux density of 75 mT; the core-loss-minimizing temperature being between 30° C. and 100° C.; a core loss change ratio Ps1 determined by the formula 1 of Ps1(%) [($Pcv_{max1}$-$Pcv_{min}$)/$PCv_{min}$]×100 being 150% or less, and a core loss change ratio Ps2 determined by the formula 2 of Ps2(%)= [($Pcv_{max2}$-$Pcv_{min}$)/$Pcv_{min}$]×100 being 200% or less, both at a frequency of 1 MHz and at an exciting magnetic flux density of 75 mT, wherein $Pcv_{min}$ represents core loss at the core-loss-minimizing temperature, $Pcv_{max1}$ represents the maximum core loss between 20° C. and 120° C., and $Pcv_{max2}$ represents the maximum core loss between 0° C. and 140° C.

A green body to be sintered is formed by granules obtained by pulverizing and mixing calcined powder of main components ($Fe_2O_3$, $Mn_3O_4$ and ZnO) and sub-component materials ($Co_3O_4$, $SiO_2$, $CaCO_3$, etc.) to a predetermined average particle size, and blending the resultant mixture with as a binder (for example, polyvinyl alcohol). Incidentally, $Co_3O_4$ may be added together with the main components before calcining. Though a binder, an organic material, is substantially decomposed in the temperature-elevating step, its carbon may remain after sintering depending on the conditions, likely deteriorating magnetic properties. Accordingly, the timing of switching to the low-oxygen-concentration atmosphere is desirably selected such that the binder is sufficiently decomposed.

In the temperature-elevating step, the concentration of oxygen in an atmosphere is preferably in a range of 0.4-2% by volume at 900° C. or higher, so that a higher-density sintered body can be obtained at a temperature of 900° C. or higher, at which the formation of ferrite starts.

The resultant MnZn-ferrite preferably comprises Fe, Mn and Zn as main components, and at least Co, Si and Ca as sub-components, the main components comprising 53-56% by mol (as $Fe_2O_3$) of Fe, and 3-9% by mol (as ZnO) of Zn, the balance being Mn as MnO, and the sub-components comprising 0.05-0.4% by mass (as $Co_3O_4$) of Co, 0.003-0.015% by mass (as $SiO_2$) of Si, 0.06-0.3% by mass (as $CaCO_3$) of Ca, 0-0.1% by mass (as $V_2O_5$) of V, and 0-0.3% by mass in total of Nb (as $Nb_2O_5$) and/or Ta (as $Ta_2O_5$), per 100% by mass of oxides of the main components.

With Fe, Zn and Mn adjusted in predetermined ranges in the above general composition design of MnZn-ferrite to obtain desired magnetic properties such as initial permeability, saturation magnetic flux density, etc., sub-components such as Co, etc. are added to adjust the crystal magnetic anisotropy constant.

Fe functions to control the temperature characteristics of core loss, together with Co. Too small an amount of Fe makes the core-loss-minimizing temperature too high, while too much an amount of Fe makes the core-loss-minimizing temperature too low, making it difficult to control the core-loss-minimizing temperature between 30° C. and 100° C., resulting in high core loss between 0° C. and 140° C. When the Fe content is 53-56% by mol as $Fe_2O_3$, low core loss is obtained in a high-frequency range of 500 kHz or more. The Fe content is more preferably 54-55% by mol as $Fe_2O_3$.

Zn has a function of controlling the frequency characteristics of permeability, particularly strong influence on the control of residual loss (magnetic domain wall resonance loss) among the core loss. A smaller amount of Zn provides lower core loss at a higher frequency range. When the Zn content is 3-9% by mol as ZnO, low core loss can be obtained in a high-frequency range of 500 kHz or more, particularly up to 2 MHz. The Zn content is more preferably 5-8% by mol as ZnO.

The Curie temperature (Tc) calculated from the percentages by mol of $Fe_2O_3$ and ZnO is in a range of 250–330° C., a practically acceptable temperature range, when the amounts of Fe and Zn are within the above ranges.

The MnZn-ferrite of the present invention comprises at least Co, Ca and Si as sub-components. Both $Co^{2+}$ and $Fe^{2+}$ are metal ions having positive crystal magnetic anisotropy constants K1, which can adjust the core-loss-minimizing temperature. Further, because of larger crystal magnetic anisotropy constants K1 than that of $Fe^{2+}$, $Co^{2+}$ and $Fe^{2+}$ effectively improve the temperature dependence of core loss. Too small amounts of $Co^{2+}$ and $Fe^{2+}$ are less effective to improve the temperature dependence of core loss, while too large amounts of $Co^{2+}$ and $Fe^{2+}$ extremely increase core loss in a low-temperature range. 0.05-0.4% by mass (as $Co_3O_4$) of Co can reduce core loss in a practical temperature range, and improve the temperature dependence of core loss. The Co content is more preferably 0.1-0.3% by mass as $Co_3O_4$.

Si is segregated in grain boundaries to increase grain boundary resistance, thereby reducing eddy current loss and thus reducing core loss in a high-frequency range. Too small an amount of Si does not increase grain boundary resistance effectively, while too large an amount of Si makes crystals larger, resulting in poor core loss. 0.003-0.015% by mass (as $SiO_2$) of Si can provide sufficient grain boundary resistance to reduce eddy current loss, thereby reducing core loss in a high-frequency range of 500 kHz or more. The Si content is more preferably 0.005-0.01% by mass as $SiO_2$.

Ca is segregated in grain boundaries like Si, increasing grain boundary resistance, thereby reducing eddy current loss and thus core loss in a high-frequency range. Too small an amount of Ca does not increase grain boundary resistance effectively, while too large an amount of Ca makes crystals larger, resulting in poor core loss. 0.06-0.3% by mass (as $CaCO_3$) of Ca can provide sufficient grain boundary resistance to reduce eddy current loss, thereby reducing core loss in a high-frequency range of 500 kHz or more. The Ca content is more preferably 0.06-0.2% by mass as $CaCO_3$.

A metal in the group 5a, which is at least one selected from the group consisting of V, Nb and Ta, may be contained as sub-components. The 5a-group metals are segregated in the form of oxides mainly in grain boundaries together with Si and Ca, resulting in higher grain boundary resistance, and thus further reduced core loss.

V has a lower melting point than those of Nb and Ta, and accelerates the growth of crystal grains. V is partially dissolved in crystal grains. Because V has a lower melting point than those of other 5a-group metals, V presumably has good wettability with crystal grains, improving the machinability of a sintered body, suppressing cracking, etc. Too much V makes crystals larger, resulting in poor core loss. 0-0.1% by mass (as $V_2O_5$) of V can provide sufficient grain boundary resistance to reduce eddy current loss, and thus reduce core loss in a high-frequency range of 500 kHz or more. The V content is more preferably 0-0.05% by mass as $V_2O_5$.

Nb and/or Ta suppress the growth of crystal grains, providing a uniform crystal structure, and thus reducing core loss. Nb and Ta have higher melting points than that of V, preventing the lowering of the melting point due to the formation of oxides of Ca, Si and Fe. When Nb and Ta are too much, they are segregated in crystal grains, resulting in poor core loss. 0-0.3% by mass in total of Nb (as $Nb_2O_5$) and Ta (as $Ta_2O_5$) can provide sufficient grain boundary resistance to reduce eddy current loss, and thus reduce core loss in a high-frequency range of 500 kHz or more. The total amount of Nb (as $Nb_2O_5$) and Ta (as $Ta_2O_5$) is more preferably 0-0.2% by mass.

The MnZn-ferrite of the present invention preferably has an average crystal grain size of 2-5 μm. The average crystal grain size of 5 μm or less provides low eddy current loss, and low residual loss due to less magnetic domain walls, thereby reducing core loss in a high-frequency range. However, the average crystal grain size of less than 2 μm makes grain boundaries act as pinning points of magnetic domain walls, tending to reduce permeability and increase core loss due to a demagnetizing field. When the average crystal grain size exceeds 5 μm, the eddy current loss increases, resulting in more core loss in a high-frequency range of 500 kHz or more.

The present invention will be explained in further detail by Examples below, without intention of restriction.

(1) Investigation of Composition

Material powders were weighed to provide the MnZn-ferrite compositions A-K shown in Table 1. $Fe_2O_3$, $Mn_3O_4$ and ZnO as main components were wet-mixed and dried, and calcined at 900° C. for 2 hours. The calcined powder was then mixed with $Co_3O_4$, $SiO_2$, $CaCO_3$, $V_2O_5$, $Ta_2O_5$ and $Nb_2O_5$, and pulverized to an average pulverized particle size (measured by an air permeability method) of 0.8-1.0 μm in a ball mill. With polyvinyl alcohol added as a binder, the mixture was granulated by a spray dryer, and compression-molded to a ring-shaped green body at 196 MPa. Each green body was sintered in an atmosphere-adjustable electric furnace to obtain a magnetic core having an outer diameter of 14 mm, an inner diameter of 7 mm and a thickness of 5 mm. The symbol "*" added to alphabets or numbers in the table below indicates Comparative Examples.

and in an alternating sinusoidal magnetic field having a frequency of 2 MHz and exciting magnetic flux densities of 25 mT, 50 mT and 75 mT.

A temperature minimizing the core loss Pcv between 0° C. and 140° C. was first determined from the measured data by a polynomial least squares method, and core loss change ratios Ps1 and Ps2 were calculated from a core loss $Pcv_{min}$ at the above temperature (minimum core loss Pcv), the maximum core loss $Pcv_{max1}$ between 20° C. and 120° C., and the maximum core loss $Pcv_{max2}$ between 0° C. and 140° C., by $$Ps1(\%) = [(Pcv_{max1} - Pcv_{min})/Pcv_{min}] \times 100, \text{ and} \qquad \text{Formula 1:}$$

$$Ps2(\%) = [(Pcv_{max2} - Pcv_{min})/Pcv_{min}] \times 100. \qquad \text{Formula 2:}$$

Saturation Magnetic Flux Density Bs

Using a DC magnetization analyzer (SK-110 available from Metron Co., Ltd.), the saturation magnetic flux density

TABLE 1

| Comp. | Main Components (% by mol) | | | Sub-Components (% by mass) | | | | | |
|---|---|---|---|---|---|---|---|---|---|
| | $Fe_2O_3$ | ZnO | MnO | $Co_3O_4$ | $CaCO_3$ | $SiO_2$ | $V_2O_5$ | $Ta_2O_5$ | $Nb_2O_5$ |
| A | 54.5 | 6.8 | Bal. | 0.19 | 0.12 | 0.005 | 0.02 | 0.1 | 0 |
| B | 54.1 | 8.9 | Bal. | 0.19 | 0.12 | 0.005 | 0.02 | 0.1 | 0 |
| C | 54.9 | 5.0 | Bal. | 0.19 | 0.12 | 0.005 | 0.02 | 0.1 | 0 |
| D | 55.5 | 3.1 | Bal. | 0.19 | 0.12 | 0.005 | 0.02 | 0.1 | 0 |
| E | 54.7 | 6.8 | Bal. | 0.19 | 0.12 | 0.005 | 0.02 | 0.1 | 0 |
| F | 54.0 | 6.8 | Bal. | 0.19 | 0.12 | 0.005 | 0.02 | 0.1 | 0 |
| G* | 54.0 | 9.9 | Bal. | 0.19 | 0.12 | 0.005 | 0.02 | 0.1 | 0 |
| H* | 55.4 | 2.1 | Bal. | 0.19 | 0.12 | 0.005 | 0.02 | 0.1 | 0 |
| I | 54.5 | 6.8 | Bal. | 0.19 | 0.12 | 0.005 | 0.02 | 0 | 0.06 |
| J | 54.5 | 6.8 | Bal. | 0.19 | 0.12 | 0.005 | 0 | 0.1 | 0 |
| K | 54.5 | 6.8 | Bal. | 0.19 | 0.12 | 0.005 | 0 | 0 | 0 |

*Comparative Example.

FIG. 1 shows the temperature conditions in the sintering step. Sintering was conducted in the air in the temperature-elevating step from room temperature to 750° C., and the replacement of the air by an $N_2$ gas was started at 750° C. to reduce the concentration of oxygen gradually to 0.8% by volume at 900° C. The temperature was then elevated at a speed of 130° C./hour to a temperature of 1090° C. set in the high-temperature-keeping step. In the high-temperature-keeping step, the concentration of oxygen was 0.8% by volume. The concentration of oxygen was gradually reduced during cooling from 1000° C. to 850° C., 0.8% by volume at 1000° C., 0.05% by volume at 900° C., and 0.005% by volume at 850° C. or lower. After cooled to 100° C. at a speed of 150° C./hour, the magnetic core was taken out of the electric furnace. The concentration of oxygen was measured by a zirconia-type oxygen analyzer, and the temperature was measured by a thermocouple attached to the sintering furnace.

The core loss Pcv, saturation magnetic flux density Bs, initial permeability μi, average crystal grain size and Curie temperature Tc of each magnetic core were evaluated by the following methods.

Core Loss Pcv

Using a B-H analyzer (SY-8232 available from Iwatsu Electric Co., Ltd.), the core loss Pcv of a magnetic core having a three-turn primary winding and a three-turn secondary winding was measured every 20° C. between 0° C. and 140° C., in an alternating sinusoidal magnetic field having frequencies of 500 kHz and 1 MHz and exciting magnetic flux densities of 25 mT, 50 mT, 75 mT and 100 mT, (Bs) of a magnetic core having a 10-turn primary winding and a 10-turn secondary winding was measured at 20° C. in a magnetic field of 1.2 kA/m.

Initial Permeability μi

The initial permeability μi of a 10-turn magnetic core was measured at 20° C. and 100 kHz in a magnetic field of 0.4 A/m by HP-4284A available from Hewlett-Packard.

Average Crystal Grain Size

The average crystal grain size was calculated by quadrature according to JIS H0501-1986 in a rectangular region of 60 μm×40 μm in a photograph (2000 times) taken by an optical or scanning electron microscope on a mirror-polished magnetic core thermally etched at 950-1050° C. for 1 hour in $N_2$. When a sufficient number (300 or more) of crystal grains were not counted because of their sizes, an observation region was expanded such that 300 or more crystal grains were observed.

Curie Temperature

It was determined by the formula described in Ferrite, the sixth issue, p. 79 (published on Nov. 30, 1986 by Maruzen): $Tc=12.8[X-(2/3) \times Z]-358$ (° C.), wherein X and Z represent % by mol of $Fe_2O_3$ and ZnO, respectively.

The core loss Pcv at a frequency of 1 MHz and an exciting magnetic flux density of 75 mT, the saturation magnetic flux density Bs, the average crystal grain size, the Curie temperature Tc, and the core loss change ratios Ps1, Ps2, which were determined as described above, are shown in Table 2.

TABLE 2

| Sample No. | Comp. | Core Loss (kW/m³) at 1 MHz, 75 mT, and | | | | | | | |
|---|---|---|---|---|---|---|---|---|---|
| | | 0° C. | 20° C. | 40° C. | 60° C. | 80° C. | 100° C. | 120° C. | 140° C. |
| 1 | A | 1150 | 995 | 905 | 870 | 915 | 1085 | 1435 | 1880 |
| 2 | B | 1210 | 1045 | 950 | 915 | 960 | 1140 | 1505 | 1975 |
| 3 | C | 1175 | 1015 | 925 | 885 | 940 | 1115 | 1480 | 1935 |
| 4 | D | 1165 | 1010 | 920 | 885 | 945 | 1120 | 1485 | 1945 |
| 5 | E | 840 | 745 | 730 | 780 | 925 | 1200 | 1620 | 2065 |
| 6 | F | 1500 | 1315 | 1200 | 1100 | 1060 | 1160 | 1445 | 1800 |
| 7* | G* | 1840 | 1590 | 1450 | 1380 | 1465 | 1735 | 2295 | 3010 |
| 8* | H* | 1380 | 1195 | 1085 | 1045 | 1190 | 1520 | 2010 | 2630 |
| 9 | I | 1175 | 1015 | 925 | 890 | 935 | 1105 | 1465 | 1920 |
| 10 | J | 1185 | 1025 | 935 | 890 | 940 | 1115 | 1480 | 1935 |
| 11 | K | 1325 | 1145 | 1040 | 1010 | 1050 | 1250 | 1650 | 2160 |

| Sample No. | $Tm^{(1)}$ (° C.) | Ps1 (%) | Ps2 (%) | Bs (mT) | Initial Permeability ($\mu i$) | Average Crystal Grain Size ($\mu m$) | Curie Temp. (° C.) |
|---|---|---|---|---|---|---|---|
| 1 | 57 | 65 | 116 | 530 | 1130 | 2.8 | 282 |
| 2 | 58 | 64 | 116 | 525 | 1170 | 3.1 | 259 |
| 3 | 56 | 67 | 119 | 540 | 890 | 2.6 | 302 |
| 4 | 56 | 68 | 120 | 545 | 765 | 2.3 | 326 |
| 5 | 35 | 122 | 183 | 535 | 1140 | 2.9 | 284 |
| 6 | 71 | 36 | 70 | 525 | 1090 | 2.8 | 275 |
| 7* | 57 | 66 | 118 | 520 | 1260 | 3.9 | 249 |
| 8* | 49 | 92 | 152 | 535 | 525 | 1.7 | 333 |
| 9 | 58 | 65 | 116 | 530 | 1130 | 2.9 | 282 |
| 10 | 58 | 66 | 117 | 530 | 1120 | 2.8 | 282 |
| 11 | 60 | 63 | 114 | 520 | 1060 | 2.1 | 282 |

$^{(1)}$Tm represents a core-loss-minimizing temperature.
*Comparative Example.

As is clear from Table 2, the MnZn-ferrites of Samples 1-6 and 9-11 (Examples of the present invention) had core loss Pcv of less than 2180 kW/m³ between 0° C. and 140° C., core-loss-minimizing temperatures in a range of 30° C. to 100° C., core loss change ratios Ps1 of 150% or less, and core loss change ratios Ps2 of 200% or less. Higher core-loss-minimizing temperatures resulted in lower core loss change ratios Ps1, Ps2, exhibiting stable core losses with small temperature dependency in a wide temperature range.

Particularly the MnZn-ferrites of Samples 1-4, 6 and 9-11 having core-loss-minimizing temperatures of 50° C. or higher suffered smaller increase in high-temperature core loss than Sample 5 having a core-loss-minimizing temperature of 35° C., exhibiting more stable core losses with smaller temperature dependency in a wider temperature range.

Comparative Example 7 containing a large amount of ZnO exhibited high initial permeability, resulting in increased residual loss. Oppositely, Comparative Example 8 containing a small amount of ZnO exhibited low initial permeability, resulting in increased hysteresis loss, and thus poor core loss as a whole.

These results reveal that as long as the amount of ZnO is within the range of the present invention, residual loss and hysteresis loss can be balanced, suppressing increase in core loss, thereby providing MnZn-ferrite having stable core losses with small temperature dependency in a wide temperature range.

The Curie temperature is not particularly restrictive as long as it is 200° C. or higher not deteriorating properties in practical use. In the composition range of the present invention, the Curie temperature is in a practically acceptable range of about 250-330° C.

Samples 1 and 9-11 were used to confirm the effects of 5a-group metals (V, Ta and Nb). Sample 11 does not contain a 5a-group metal. These comparisons reveal that those containing 5a-group metals have lower core losses.

(2) Investigation of High-Temperature-Keeping Step

Magnetic cores of MnZn-ferrite were produced in the same manner as in Sample 1 having the composition A shown in Table 1, except for changing the keeping temperature between 1025° C. and 1175° C. as shown in Table 3 in the high-temperature-keeping step of sintering. The magnetic properties, etc. of the resultant magnetic cores are shown in Table 3, in which "-" means "not evaluated." The same is true below.

TABLE 3

| Sample No. | Comp. | Keeping Temperature (° C.) | Core Loss (kW/m³) at 1 MHz, 75 mT, and | | | | | | | |
|---|---|---|---|---|---|---|---|---|---|---|
| | | | 0° C. | 20° C. | 40° C. | 60° C. | 80° C. | 100° C. | 120° C. | 140° C. |
| 1 | A | 1090 | 1150 | 995 | 905 | 870 | 915 | 1085 | 1435 | 1880 |
| 12* | A | 1175 | 1955 | 1690 | 1540 | 1480 | 1600 | 1950 | 2580 | 3385 |
| 13* | A | 1150 | 1335 | 1155 | 1050 | 1020 | 1060 | 1260 | 1665 | 2180 |
| 14 | A | 1115 | 1155 | 1000 | 925 | 905 | 980 | 1180 | 1535 | 1990 |
| 15 | A | 1075 | 1300 | 1150 | 1060 | 1010 | 1035 | 1200 | 1605 | 2090 |

TABLE 3-continued

| | | | | | | | | | | |
|---|---|---|---|---|---|---|---|---|---|---|
| 16* | A | 1050 | 1495 | 1295 | 1175 | 1120 | 1190 | 1410 | 1865 | 2445 |
| 17* | A | 1025 | — | 4200 | — | — | — | — | — | — |

| Sample No. | Tm[(1)] (° C.) | Ps1 (%) | Ps2 (%) | Bs (mT) | Initial Permeability (μi) | Average Crystal Grain Size (μm) |
|---|---|---|---|---|---|---|
| 1 | 57 | 65 | 116 | 530 | 1130 | 2.8 |
| 12* | 55 | 74 | 129 | — | — | — |
| 13* | 56 | 63 | 114 | 540 | 1270 | 4.2 |
| 14 | 51 | 70 | 120 | 535 | 1160 | 3.6 |
| 15 | 61 | 59 | 107 | 525 | 1010 | 2.3 |
| 16* | 58 | 67 | 118 | 515 | 980 | 2.0 |
| 17* | — | — | — | — | 530 | — |

Note:
[(1)]Tm represents a core-loss-minimizing temperature.
*Comparative Example.

As is clear from Table 3, the MnZn-ferrites of Samples 1, 14 and 15 (Examples of the present invention) had stable core losses with small temperature dependency in a wide temperature range. The magnetic cores of Samples 12 and 13 produced at the keeping temperatures of 1150° C. or higher in the high-temperature-keeping step had relatively large crystal grain sizes due to accelerated sintering, and high-temperature core losses of 2180 kW/m³ or more. Higher eddy current losses of these samples are presumably due to increased crystal grain sizes. On the other hand, the magnetic cores of Samples 16 and 17 produced at the keeping temperatures of 1050° C. or lower in the high-temperature-keeping step did not have sufficient sintering densities, presumably having structures containing many fine crystals and pores. The magnetic core of Sample 16 produced at the keeping temperature of 1050° C. had a high-temperature core loss of 2180 kW/m³ or more, and particularly the magnetic core of Sample 17 produced at the keeping temperature of 1025° C. had core loss much larger than 2180 kW/m³ at 20° C.

Figure 2:
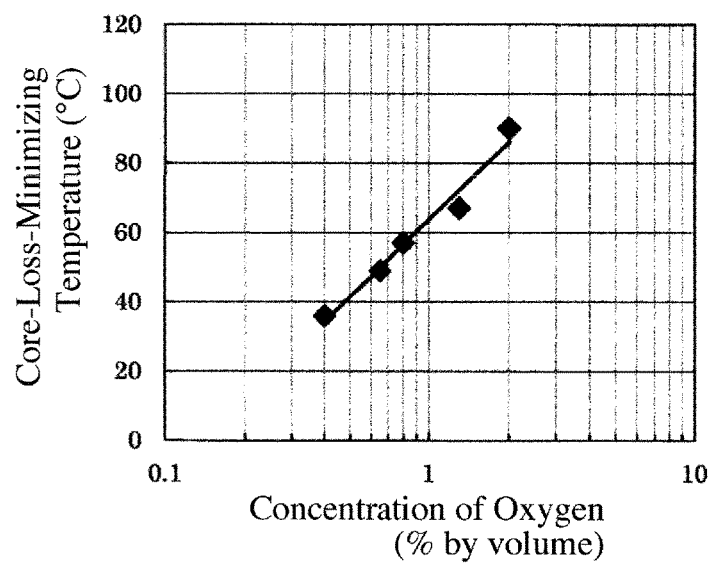
FIG. 2 is a graph showing the relation between the concentration of oxygen and a core-loss-minimizing temperature in a high-temperature-keeping step.

Magnetic cores of MnZn-ferrite were produced in the same manner as in Sample 1 having the composition A shown in Table 1, except for changing the concentration of oxygen in a range of 0.2-3% by volume as shown in Table 4, with the keeping temperature unchanged at 1090° C. in the high-temperature-keeping step. The concentration of oxygen between 1090° C. and 850° C. in the cooling step was adjusted as shown in Table 4 at 1090° C., and to 0.05% by volume at 900° C., and 0.005% by volume at 850° C. The magnetic properties, etc. of the resultant magnetic cores are shown in Table 4, and the relations between the concentration of oxygen and a core-loss-minimizing temperature in the high-temperature-keeping step are shown in FIG. 2.

TABLE 4

| Sample No. | Comp. | Oxygen Conc. (% by vol.) | Core Loss (kW/m³) at 1 MHz, 75 mT, and | | | | | | | |
|---|---|---|---|---|---|---|---|---|---|---|
| | | | 0° C. | 20° C. | 40° C. | 60° C. | 80° C. | 100° C. | 120° C. | 140° C. |
| 1 | A | 0.8 | 1150 | 995 | 905 | 870 | 915 | 1085 | 1435 | 1880 |
| 18* | A | 3 | 2860 | 2770 | 2650 | 2530 | 2400 | 2310 | 2350 | 2440 |
| 19 | A | 2 | 1650 | 1470 | 1370 | 1305 | 1280 | 1260 | 1345 | 1550 |
| 20 | A | 1.3 | 1365 | 1195 | 1090 | 1025 | 1010 | 1105 | 1375 | 1715 |
| 21 | A | 0.65 | 1050 | 910 | 840 | 830 | 905 | 1140 | 1550 | 2005 |
| 22 | A | 0.4 | 885 | 785 | 765 | 820 | 975 | 1265 | 1705 | 2175 |
| 23* | A | 0.2 | 660 | 640 | 670 | 780 | 995 | 1320 | 1815 | 2360 |

| Sample No. | Tm[(1)] (° C.) | Ps1 (%) | Ps2 (%) | Bs (mT) | Initial Permeability (μi) | Average Crystal Grain Size (μm) |
|---|---|---|---|---|---|---|
| 1 | 57 | 65 | 116 | 530 | 1130 | 2.8 |
| 18* | 111 | 20 | 24 | — | 930 | 5.7 |
| 19 | 90 | 17 | 31 | 525 | 1010 | 4.1 |
| 20 | 67 | 36 | 70 | 530 | 1060 | 3.3 |
| 21 | 49 | 87 | 142 | 535 | 1140 | 2.8 |
| 22 | 36 | 123 | 184 | 535 | 1230 | 2.7 |
| 23* | 21 | 184 | 269 | — | 1260 | 2.7 |

Note:
[(1)]Tm represents a core-loss-minimizing temperature.
*Comparative Example.

As is clear from Table 4, Samples 1 and 19-22 of the present invention had core losses Pcv of less than 2180 kW/m³ between 0° C. and 140° C., and core-loss-minimizing temperatures in a range of 30° C. to 100° C. Also, Samples 1 and 19-22 were MnZn-ferrites having core loss change ratios Ps1 of 150% or less, and Ps2 of 200% or less, exhibiting stable core losses with small temperature dependency in a wide temperature range. On the other hand, Sample 23 of Comparative Example had a core loss change ratio Ps1 of more than 150%, and Ps2 of more than 250%.

Though the influence of the concentration of oxygen at the high-temperature-keeping step has been described above, a lower concentration of oxygen tends to lead to a lower core-loss-minimizing temperature as shown in FIG. 2, for example, 36° C. in Sample 22 having an oxygen concentration of 0.4% by volume. Oppositely, a higher concentration of oxygen tends to lead to a higher core-loss-minimizing temperature, for example, 90° C. in Example 19 having an oxygen concentration of 2% by volume. Thus, the core-loss-minimizing temperature can be adjusted by the composition and sintering conditions of MnZn-ferrite. Such changes of core-loss-minimizing temperatures are presumably due to the influence of the amount of $Fe^{2+}$ ions in MnZn-ferrite.

It is considered that the concentration of oxygen of more than 2% by volume makes the atmosphere too oxidative, forming too large crystals which provide increased eddy current loss. Oppositely, when the concentration of oxygen was less than 0.4% by volume, high-temperature core loss tended to become large.

(3) Investigation of Second Cooling Step

Figure 3:
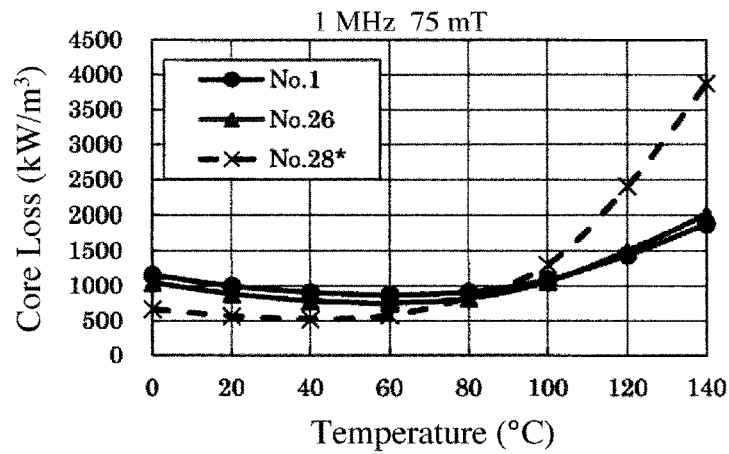
FIG. 3 is a graph showing the temperature characteristics of core loss at a frequency of 1 MHz and at an exciting magnetic flux density of 75 mT, in the MnZn-ferrites of Examples and Comparative Example.
Figure 4:
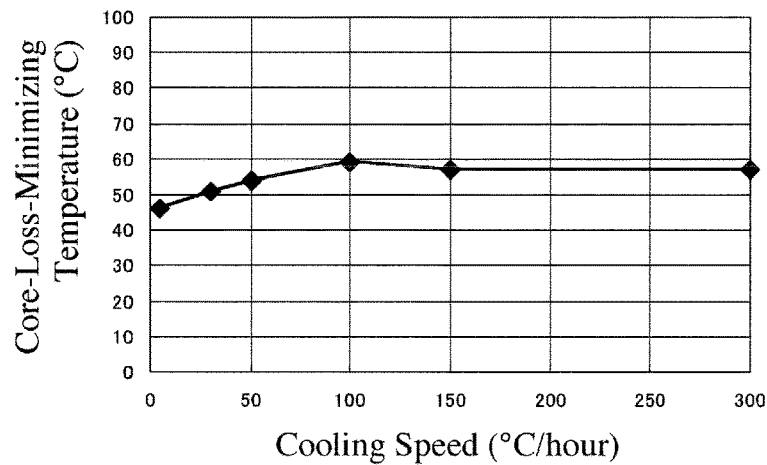
FIG. 4 is a graph showing the relation between a cooling speed and a core-loss-minimizing temperature, in the second cooling step of the MnZn-ferrites of Examples and Comparative Examples.

Magnetic cores of MnZn-ferrite were produced in the same manner as in Sample 1 having the composition A shown in Table 1 (Tc=282° C.), except that after they were cooled to 352° C. at a cooling speed of 150° C./hour, the cooling speed in a range from 352° C. to 100° C. was changed to 5-300° C./hour as shown in Table 5. The magnetic properties, etc. of the resultant magnetic cores are shown in Table 5. The temperature characteristics of core loss of Samples 1, 26 and 28 are shown in FIG. 3. The relations between a cooling speed and a core-loss-minimizing temperature in the second cooling step are shown in FIG. 4.

core losses with small temperature dependency in a wide temperature range. Though FIG. 4 and Table 5 indicate that a lower cooling speed leads to a lower core-loss-minimizing temperature, resulting in increased high-temperature core loss, a cooling speed of 100° C./hour or more (Samples 1, 24 and 25) below 352° C. resulted in a substantially constant core-loss-minimizing temperature, suppressing increase in a high-temperature core loss.

Why the high-temperature core loss increased when slowly cooled at less than 50° C./hour in the second cooling step may be considered as follows, though not necessarily clear. Namely, slow cooling in the sintering step provides proper induced magnetic anisotropy, making $Co^{2+}$ ions and $Fe^{2+}$ ions fixed to magnetic domain walls, thereby reducing core loss (residual loss) due to magnetic domain wall resonance by suppressing the movement of magnetic domain walls, but a snake-shaped (called "perminvar-type") hysteresis tends to occur, so that the hysteresis is deformed at a higher exciting magnetic flux density, resulting in increased hysteresis loss. It is considered that a small exciting magnetic flux density, at which the residual loss is predominant, provides low core loss by slow cooling at a speed of less than 50° C./hour, while a large exciting magnetic flux density, at which the hysteresis loss is influential, provides extreme increase in high-temperature core loss. The selection of cooling conditions for properly obtaining the effect of induced magnetic anisotropy depending on the exciting magnetic flux density is also extremely important to suppress core loss and its temperature dependency.

The core losses of Samples 1 and 28 measured at a frequency of 1 MHz and an exciting magnetic flux density

TABLE 5

| Sample No. | Comp. | Cooling Speed (° C./hr) | Core Loss (kW/m³) at 1 MHz, 75 mT, and | | | | | | | |
|---|---|---|---|---|---|---|---|---|---|---|
| | | | 0° C. | 20° C. | 40° C. | 60° C. | 80° C. | 100° C. | 120° C. | 140° C. |
| 1 | A | 150 | 1150 | 995 | 905 | 870 | 915 | 1085 | 1435 | 1880 |
| 24 | A | 300 | 1160 | 1005 | 915 | 875 | 925 | 1095 | 1450 | 1900 |
| 25 | A | 100 | 1145 | 990 | 895 | 855 | 900 | 1075 | 1460 | 1880 |
| 26 | A | 50 | 1045 | 885 | 785 | 755 | 820 | 1060 | 1500 | 2015 |
| 27* | A | 30 | 1020 | 860 | 770 | 750 | 835 | 1105 | 1625 | 2235 |
| 28* | A | 5 | 660 | 565 | 520 | 575 | 840 | 1300 | 2405 | 3870 |

*Comparative Example.

| Sample No. | $Tm^{(1)}$ (° C.) | Ps1 (%) | Ps2 (%) | Bs (mT) | Initial Permeability ($\mu i$) | Average Crystal Grain Size ($\mu m$) |
|---|---|---|---|---|---|---|
| 1 | 57 | 65 | 116 | 530 | 1130 | 2.8 |
| 24 | 57 | 67 | 117 | — | 1140 | 2.8 |
| 25 | 59 | 80 | 120 | — | 1030 | 2.8 |
| 26 | 54 | 99 | 167 | — | 1020 | 2.8 |
| 27* | 51 | 168 | 198 | — | 950 | 2.8 |
| 28* | 46 | 362 | 644 | — | 760 | 2.8 |

Figure 5:
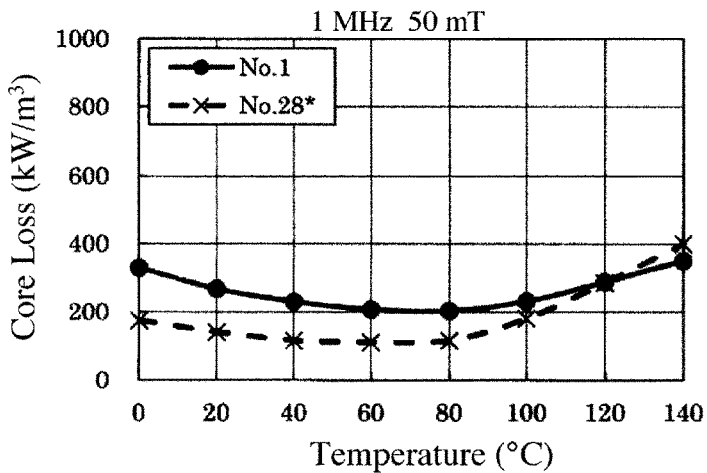
FIG. 5 is a graph showing the temperature characteristics of core loss at a frequency of 1 MHz and at an exciting magnetic flux density of 50 mT, in the MnZn-ferrites of Example and Comparative Example.

Note:
$^{(1)}$Tm represents a core-loss-minimizing temperature.
*Comparative example As is clear from Table 5 and FIG. 3, Samples 1 and 24-26 of the present invention were MnZn-ferrites having stable of 50 mT are shown in Table 6. The temperature characteristics of their core losses are shown in FIG. 5.

TABLE 6

| Sample No. | Comp. | Cooling Speed (° C./hr) | Core Loss (kW/m³) at 1 MHz, 50 mT, and | | | | | | | |
|---|---|---|---|---|---|---|---|---|---|---|
| | | | 0° C. | 20° C. | 40° C. | 60° C. | 80° C. | 100° C. | 120° C. | 140° C. |
| 1 | A | 150 | 330 | 270 | 235 | 205 | 200 | 230 | 290 | 345 |
| 28* | A | 5 | 175 | 140 | 115 | 110 | 115 | 180 | 285 | 400 |

| Sample No. | Tm⁽¹⁾ (° C.) | Ps1 (%) | Ps2 (%) |
|---|---|---|---|
| 1 | 68 | 45 | 73 |
| 28* | 58 | 159 | 264 |

Note:
⁽¹⁾Tm represents a core-loss-minimizing temperature.
*Comparative Example.

As is clear from Table 6 and FIG. 5, the core loss and its change ratio at 140° C., a frequency of 1 MHz and an exciting magnetic flux density of 50 mT were larger in the magnetic core of Sample 28 (Comparative Example) than in that of Sample 1 (Example). The comparison of Tables 5 and 6 reveals that with respect to Samples 1 and 28, the exciting magnetic flux density of 75 mT provides larger effects of reducing core loss and improving its temperature dependency at 140° C. than the exciting magnetic flux density of 50 mT.

Figure 6:
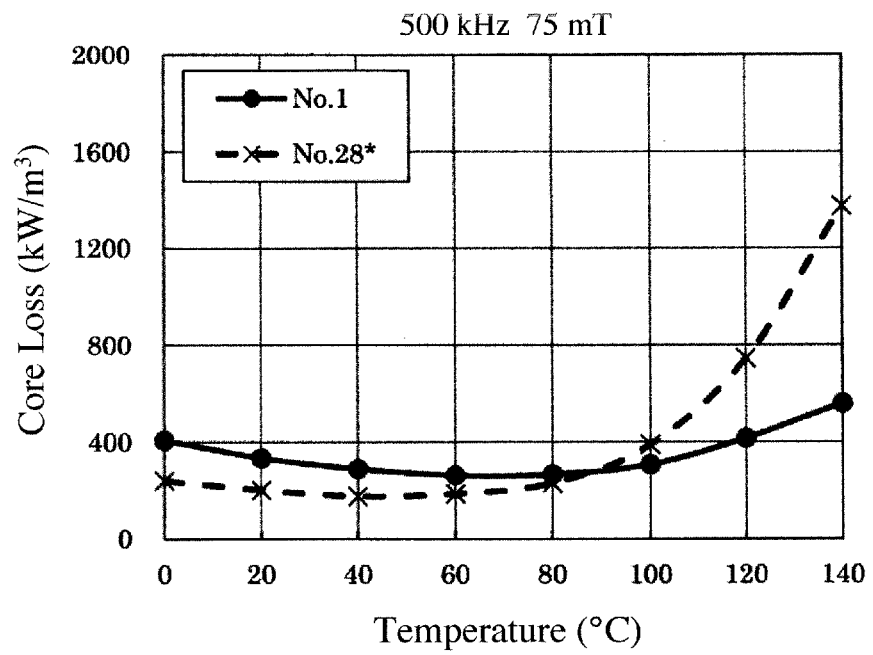
FIG. 6 is a graph showing the temperature characteristics of core loss at a frequency of 500 kHz and at an exciting magnetic flux density of 75 mT, in the MnZn-ferrites of Example and Comparative Example.

The core losses of Samples 1 and 28 measured at a frequency of 500 kHz and an exciting magnetic flux density of 75 mT are shown in Table 7. The temperature characteristics of their core losses are shown in FIG. 6.

TABLE 7

| Sample No. | Comp. | Cooling Speed (° C./hr) | Core Loss (kW/m³) at 500 kHz, 75 mT, and | | | | | | | |
|---|---|---|---|---|---|---|---|---|---|---|
| | | | 0° C. | 20° C. | 40° C. | 60° C. | 80° C. | 100° C. | 120° C. | 140° C. |
| 1 | A | 150 | 405 | 335 | 290 | 265 | 265 | 310 | 415 | 560 |
| 28* | A | 5 | 240 | 200 | 175 | 185 | 230 | 390 | 745 | 1375 |

| Sample No. | Tm⁽¹⁾ (° C.) | Ps1 (%) | Ps2 (%) |
|---|---|---|---|
| 1 | 63 | 57 | 111 |
| 28* | 50 | 326 | 686 |

*Comparative Example.
Note:
⁽¹⁾Tm represents a core-loss-minimizing temperature.

As is clear from Table 7 and FIG. 6, at a frequency of 500 kHz and an exciting magnetic flux density of 75 mT, the core loss of the magnetic core of Sample 28 (Comparative Example) drastically increased when exceeding 80° C., while the core loss of the magnetic core of Sample 1 (Example) was small even at 100° C. or higher, exhibiting a stable core loss with small temperature dependency in a wide temperature range.

Figure 7:
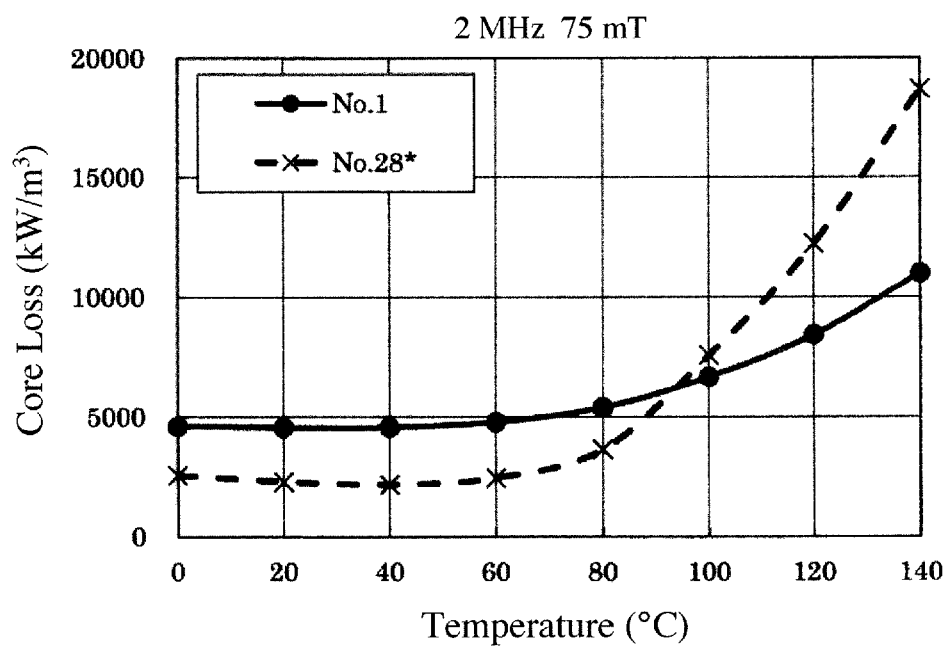
FIG. 7 is a graph showing the temperature characteristics of core loss at a frequency of 2 MHz and at an exciting magnetic flux density of 75 mT, in the MnZn-ferrites of Example and Comparative Example.

The core losses of Samples 1 and 28 measured at a frequency of 2 MHz and an exciting magnetic flux density of 75 mT are shown in Table 8. The temperature characteristics of their core losses are shown in FIG. 7.

TABLE 8

| Sample No. | Comp. | Cooling Speed (° C./hr) | Core Loss (kW/m³) at 2 MHz, 75 mT, and | | | | | | | |
|---|---|---|---|---|---|---|---|---|---|---|
| | | | 0° C. | 20° C. | 40° C. | 60° C. | 80° C. | 100° C. | 120° C. | 140° C. |
| 1 | A | 150 | 4610 | 4560 | 4565 | 4780 | 5385 | 6665 | 8425 | 11030 |
| 28* | A | 5 | 2575 | 2305 | 2180 | 2465 | 3665 | 7570 | 12230 | 18690 |

TABLE 8-continued

| Sample No. | Tm[1] (° C.) | Ps1 (%) | Ps2 (%) |
|---|---|---|---|
| 1 | 29 | 85 | 142 |
| 28* | 44 | 461 | 757 |

Note:
[1]Tm represents a core-loss-minimizing temperature.
*Comparative Example.

As is clear from Table 8 and FIG. 7, at a frequency of 2 MHz and an exciting magnetic flux density of 75 mT, Sample 28 (Comparative Example) exhibited smaller core loss at a low temperature of 80° C. or lower, while Sample 1 (Example) exhibited smaller core loss at 100° C. or higher, indicating that the MnZn-ferrite magnetic core of Sample 1 had a stable core loss with small temperature dependency in a wide temperature range.

Figure 8:
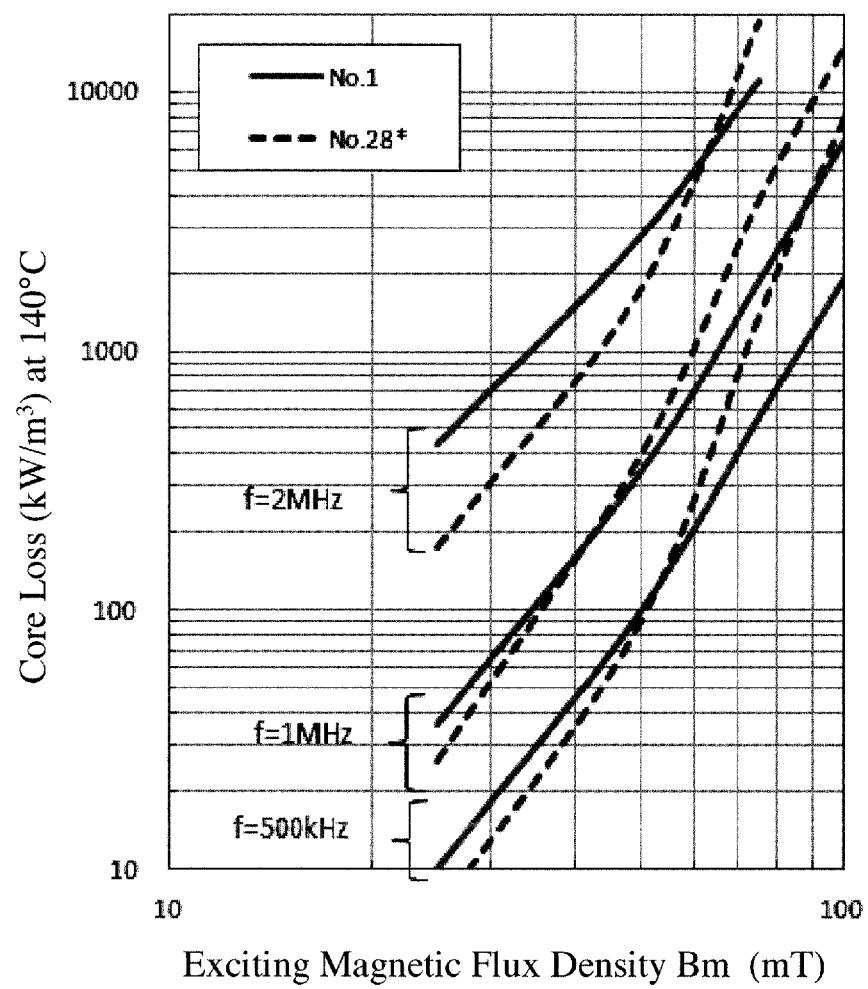
FIG. 8 is a graph showing the relation of core loss at 140° C. to an exciting magnetic flux density in the MnZn-ferrites of Example and Comparative Example.

The core losses of Samples 1 and 28 measured at 140° C. and frequencies of 500 kHz, 1 MHz and 2 MHz, with exciting magnetic flux densities varying from 25 mT to 100 mT, are shown in FIG. 8.

As is clear from FIG. 8, at a high temperature and a high exciting magnetic flux density, the MnZn-ferrite of Sample 1 (Example) of the present invention exhibited low core loss at any frequency of 500 kHz, 1 MHz and 2 MHz. The effect of reducing core loss was particularly large at a frequency of 1 MHz and an exciting magnetic flux density of 50 mT or more.

What is claimed is:

1. A method for producing MnZn-ferrite comprising Fe, Mn and Zn as main components, and at least Co, Si and Ca as sub-components,
the main components in said MnZn-ferrite comprising 53-56% by mol (as $Fe_2O_3$) of Fe, and 3-9% by mol (as ZnO) of Zn, the balance being Mn as MnO, and
said sub-components comprising 0.05-0.4% by mass (as $Co_3O_4$) of Co, 0.003-0.01% by mass (as $SiO_2$) of Si, 0.06-0.3% by mass (as $CaCO_3$) of Ca, 0-0.1% by mass (as $V_2O_5$) of V, and 0-0.3% by mass in total of Nb (as $Nb_2O_5$) and/or Ta (as $Ta_2O_5$), per 100% by mass of oxides of said main components,
the method comprising the steps of
sintering a green body to obtain MnZn-ferrite;
said sintering comprising a temperature-elevating step, a high-temperature-keeping step, and a cooling step;
said high-temperature-keeping step being conducted at a keeping temperature of 1070-1090° C. in an atmosphere having an oxygen concentration of 0.6-2% by volume;
the concentration of oxygen being in a range of 0.001-0.2% by volume during cooling from 900° C. to 400° C. in said cooling step; and
a cooling speed between (Tc+70)° C. and 100° C. being 50° C./hour or more and 300° C./hour or less, wherein Tc represents a Curie temperature (° C.) calculated from the percentages by mol of $Fe_2O_3$ and ZnO contained in the main components in said MnZn-ferrite, and
said MnZn-ferrite having core loss Pcv of 2090 kW/m³ or less between 0° C. and 140° C. at a frequency of 1 MHz and at an exciting magnetic flux density of 75 mT.

2. The method for producing MnZn-ferrite according to claim 1, wherein said high-temperature-keeping step is conducted in an atmosphere having an oxygen concentration of 0.6-1.5% by volume.

3. The method for producing MnZn-ferrite according to claim 1, wherein the cooling speed between (Tc+70) ° C. and 100° C. is 100° C./hour or more and 150° C./hour or less.

4. The method for producing MnZn-ferrite according to claim 1, wherein the concentration of oxygen is 0.001-0.1% by volume at 900° C. in said cooling step.

5. The method for producing MnZn-ferrite according to claim 4, wherein the concentration of oxygen is 0.01-0.1% by volume at 900° C. in said cooling step.

6. The method for producing MnZn-ferrite according to claim 1, wherein the concentration of oxygen in an atmosphere is in a range of 0.4-2% by volume at least in a range of 900° C. or higher in said temperature-elevating step.

7. MnZn-ferrite comprising Fe, Mn and Zn as main components, and at least Co, Si and Ca as sub-components;
said main components comprising 53-56% by mol (as $Fe_2O_3$) of Fe, and 3-9% by mol (as ZnO) of Zn, the balance being Mn as MnO;
said sub-components comprising 0.05-0.4% by mass (as $Co_3O_4$) of Co, 0.003-0.015% by mass (as $SiO_2$) of Si, 0.06-0.3% by mass (as $CaCO_3$) of Ca, 0-0.1% by mass (as $V_2O_5$) of V, and 0-0.3% by mass (as $Nb_2O_5$) of Nb, per 100% by mass of oxides of said main components, with the proviso that Ta (as $Ta_2O_5$) is not present; and
said MnZn-ferrite having core loss Pcv of less than 2180 kW/m³ between 0° C. and 140° C. at a frequency of 1 MHz and at an exciting magnetic flux density of 75 mT.

8. The MnZn-ferrite according to claim 7, wherein a core loss change ratio Ps1 determined by the formula 1 of $Ps1(\%)=[(Pcv_{max1}-Pcv_{min})/Pcv_{min}]\times100$ is 150% or less at a frequency of 1 MHz and at an exciting magnetic flux density of 75 mT, and a core loss change ratio Ps2 determined by the formula 2 of $Ps2(\%)=[(Pcv_{max2}-Pcv_{min})/Pcv_{min}]\times100$ is 200% or less at a frequency of 1 MHz and at an exciting magnetic flux density of 75 mT, wherein $Pcv_{min}$ represents core loss at a core-loss-minimizing temperature between 30° C. and 100° C., $Pcv_{max1}$ represents the maximum core loss between 20° C. and 120° C., and $Pcv_{max2}$ represents the maximum core loss between 0° C. and 140° C.

9. A method for producing the MnZn-ferrite according to claim 7, the method comprising the steps of
sintering a green body to obtain MnZn-ferrite;
said sintering comprising a temperature-elevating step, a high-temperature-keeping step, and a cooling step;
said high-temperature-keeping step being conducted at a keeping temperature of higher than 1050° C. and lower than 1150° C. in an atmosphere having an oxygen concentration of 0.6-2% by volume;
the concentration of oxygen being in a range of 0.001-0.2% by volume during cooling from 900° C. to 400° C. in said cooling step; and a cooling speed between (Tc+70) ° C. and 100° C. being 50° C./hour or more, wherein Tc represents a Curie temperature (° C.) calculated from the percentages by mol of $Fe_2O_3$ and ZnO contained in the main components in said MnZn-ferrite.

* * * * *